United States Patent
Levy et al.

(10) Patent No.: US 11,438,528 B2
(45) Date of Patent: Sep. 6, 2022

(54) SYSTEM AND METHOD FOR SHORT-WAVE-INFRA-RED (SWIR) SENSING AND IMAGING

(71) Applicant: TriEye Ltd., Tel Aviv (IL)

(72) Inventors: Uriel Levy, Kiryat Ono (IL); Avraham Bakal, Tel Aviv (IL); Omer Kapach, Jerusalem (IL)

(73) Assignee: TriEye Ltd., Tel Aviv (IL)

( * ) Notice: Subject to any disclaimer, the term of this patent is extended or adjusted under 35 U.S.C. 154(b) by 411 days.

(21) Appl. No.: 16/610,687

(22) PCT Filed: May 7, 2018

(86) PCT No.: PCT/IB2018/053164
§ 371 (c)(1),
(2) Date: Nov. 4, 2019

(87) PCT Pub. No.: WO2018/211354
PCT Pub. Date: Nov. 22, 2018

(65) Prior Publication Data
US 2021/0156969 A1      May 27, 2021

Related U.S. Application Data

(60) Provisional application No. 62/505,943, filed on May 14, 2017.

(51) Int. Cl.
*G01S 7/481*      (2006.01)
*H04N 5/33*       (2006.01)
(Continued)

(52) U.S. Cl.
CPC ............. *H04N 5/33* (2013.01); *G01S 7/4816* (2013.01); *G01S 17/89* (2013.01); *G01S 17/931* (2020.01); *H04N 5/2256* (2013.01)

(58) Field of Classification Search
CPC ...... H04N 5/33; H04N 5/2256; G01S 7/4816; G01S 17/89; G01S 17/931; G01S 17/04
See application file for complete search history.

(56) References Cited

U.S. PATENT DOCUMENTS

2006/0138333 A1    6/2006  Nascetti et al.
2009/0309315 A1   12/2009  Jahier
(Continued)

FOREIGN PATENT DOCUMENTS

CN       102740012 A    * 10/2012    ............. H04N 5/335

OTHER PUBLICATIONS

Hilton et al., "Wafer-Level Vacuum Packaging of Smart Sensors" Sensors 16, No. 11: 1819 (Year: 2016).*
(Continued)

*Primary Examiner* — Marcus H Taningco
(74) *Attorney, Agent, or Firm* — Nathan & Associates; Menachem Nathan

(57) ABSTRACT

Focal plane arrays (FPAs) of plasmonic enhanced pyramidal silicon Schottky photodetectors (PDs) operative in the short wave infrared (SWIR) regime, and imaging systems combining such FPAs with active illumination sources and readout integrated circuit (ROIC). Such imaging systems enable imaging in the SWIR regime using inexpensive silicon detector arrays, specifically in vehicular environments in which such an imaging system may be mounted on a vehicle and image various moving and stationary targets.

20 Claims, 5 Drawing Sheets

(51) Int. Cl.
  *G01S 17/89* (2020.01)
  *G01S 17/931* (2020.01)
  *H04N 5/225* (2006.01)

(56) References Cited

U.S. PATENT DOCUMENTS

| | | | |
|---|---|---|---|
| 2010/0309315 A1* | 12/2010 | Hogasten | H04N 7/181 |
| | | | 348/E5.09 |
| 2012/0145883 A1 | 6/2012 | Liu et al. | |
| 2014/0231514 A1 | 8/2014 | Burkland et al. | |
| 2017/0219693 A1* | 8/2017 | Choiniere | G01S 17/89 |

OTHER PUBLICATIONS

Desatov et al; "Plasmonic enhanced silicon pyramids for internal photoemission Schottky detectors in the near-infrared regime" Optical Society of America vol. 2, No. 4 pp. 335-338. (2015).
International Search Report and Written Opinion in related PCT patent application PCT/IB2017/054037, dated Aug. 23, 2018. 11 pages.

* cited by examiner

SYSTEM AND METHOD FOR SHORT-WAVE-INFRA-RED (SWIR) SENSING AND IMAGING

CROSS REFERENCE TO RELATED APPLICATIONS

This application is a 35 U.S.C 111(a) continuation-in-part (CIP) application of International Application PCT/IB2018/053164 filed May 7, 2018, through which it claims priority from U.S. Provisional Patent Application No. 62/505,943 filed May 14, 2017, which is incorporated herein by reference in its entirety.

FIELD

Embodiments disclosed herein relate in general to vision systems in the SWIR wavelength range (1100 nm-1900 nm), and in particular to vision systems for the automotive industry operating in the 1350 nm-1400 nm and the 1450-1600 nm wavelength ranges.

BACKGROUND

Current imaging systems operating in the visible wavelength range (400-700 nm) or the near infrared (NIR) regime (typically up to about 1000 nm) are prone to significant reduction in performance in extreme weather conditions, e.g. fog and dust. Furthermore, under high levels of ambient light intensity, such imaging systems may become saturated and cannot perform the task of collecting a high quality image. Typical imaging systems operating at longer wavelengths in the SWIR regime are based on material systems such as InGaAs and are therefore inherently expensive and not suitable for low cost applications.

SUMMARY

Embodiments disclosed herein teach Si-based imaging systems and methods that allow photodetection of light in the SWIR regime. Light in the SWIR band is not visible to the human eye, thus providing an inherent advantage for eye-safe applications. SWIR images are not in color, which makes objects easily recognizable and yields one of the tactical advantages of the SWIR, namely object or individual identification.

A large number of applications that are difficult or impossible to perform using visible light are possible using SWIR. When imaging in SWIR, the scattering of light by water vapor, fog and dust particles, for example, are less pronounced and better (e.g. higher signal to noise ratio, or reduced image blur) imaging can be obtained. This is due to the longer wavelength of the SWIR photon with respect to the visible regime. Additionally, colors that appear almost identical in the visible may be easily differentiated using SWIR.

In exemplary embodiments, there are provided imaging systems comprising an active illumination source for illuminating a target in a SWIR wavelength range with radiation in the form of an orbital angular momentum (OAM) beam, a focal plane array (FPA) of plasmonic enhanced pyramidal silicon Schottky photodetectors (PDs), wherein each PD includes an embedded spiral plasmonic lens that can focus and detect a specific value of a total OAM, and wherein each PD is operative to detect SWIR radiation reflected from the target and to convert the detected SWIR radiation into an electrical signal, and a readout integrated circuit (ROIC) operatively coupled to the FPA and used to read out electrical signals the PDs, wherein the read out electrical signals are convertible into an image of the target.

The SWIR wavelength range may include for example the 1350 nm-1400 nm wavelength range or the 1450 nm-1600 nm wavelength range. Each plasmonic enhanced pyramidal silicon Schottky PD includes a contact to a silicon side of the Schottky PD and a contact to a metal side of the Schottky PD.

In some embodiments, the FPA and the ROIC may be formed integrally in a single silicon wafer.

In some embodiments, the FPA and the ROIC may be formed on separate silicon wafers. In some embodiments, FPA may include a plurality of pixels, wherein each pixel includes a single plasmonic enhanced pyramidal silicon Schottky PD.

In some embodiments, the FPA includes a plurality of super-pixels, wherein each super-pixel includes a plurality of plasmonic enhanced pyramidal silicon Schottky PDs.

In some embodiments with super-pixels, the contact to the metal side may be common to all the Schottky PDs in a super-pixel.

In some embodiments, the active illumination may be shaped in the form of an OAM beam of a specific order m, and each pixel of the FPA is designed to detect only beams with the same angular momentum.

In some embodiments, an imaging system disclosed herein is included in a vehicle and used in a vehicular environment.

In exemplary embodiments, there are provided methods comprising actively illuminating a target with radiation in the form of an OAM beam in a SWIR wavelength range, using a FPA of plasmonic enhanced pyramidal silicon Schottky PDs to detect SWIR radiation reflected from the target, wherein each PD includes an embedded spiral plasmonic lens that can focus and detect a specific value of a total OAM, and converting the detected SWIR radiation into a SWIR image of the target.

The FPA may include a plurality of pixels, wherein each pixel includes a single plasmonic enhanced pyramidal silicon Schottky PD, or a plurality of super-pixels, wherein each super-pixel includes a plurality of plasmonic enhanced pyramidal silicon Schottky PDs.

In various embodiments, there are provided focal plane arrays comprising a plurality of plasmonic enhanced pyramidal silicon Schottky PDs, wherein each PD includes an embedded spiral plasmonic lens that can focus and detect a specific value of a total OAM, wherein each PD is operative to detect SWIR radiation reflected from a target in a SWIR wavelength range, and wherein the detected radiation is convertible into an image of the target.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein and should not be considered limiting in any way.

DETAILED DESCRIPTION

Systems and methods disclosed herein are directed towards enhancing imaging information, particularly in vehicular driving environments, by enabling vision in extreme weather (for example fog, haze, snow, rain, summer) conditions and in all light condition (for example low light or direct sunlight).

Figure 1:
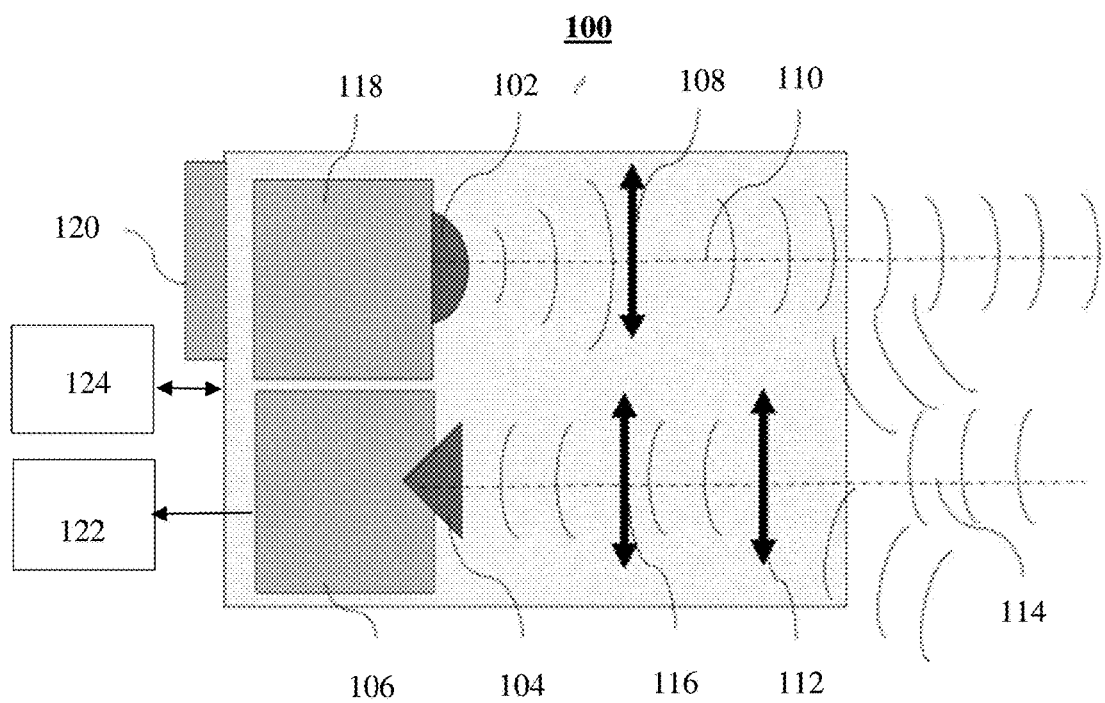
FIG. 1 illustrates schematically an imaging system disclosed herein.

FIG. 1 illustrates schematically an embodiment of an imaging system disclosed herein numbered 100. System 100 comprises an active illumination source 102 (e.g. laser, LED or lamp) for illuminating an imaged entity (or "target") and a focal plane array (FPA) 104 of plasmonic enhanced pyramidal silicon Schottky PDs (see also FIGS. 3A-3C) for receiving and collecting radiation reflected from the imaged entity. FPA 104 is electrically and mechanically coupled to a read-out integrated circuit (ROIC) 106. The ROIC is implemented with the goal of accumulating the electrical signal from each of the Schottky photodetector pixels as an electrical charge and transfer the signal onto output taps for readout. Such a ROIC may be for example implemented in a 3 transistor (3T) or a 4T configurations. Alternatively, one can utilize the fast response time of a nano-sized Schottky diode and construct an ROIC with a sufficiently short RC time constant to support ultrafast operation, e.g. for gated imaging applications.

Figure 3A:
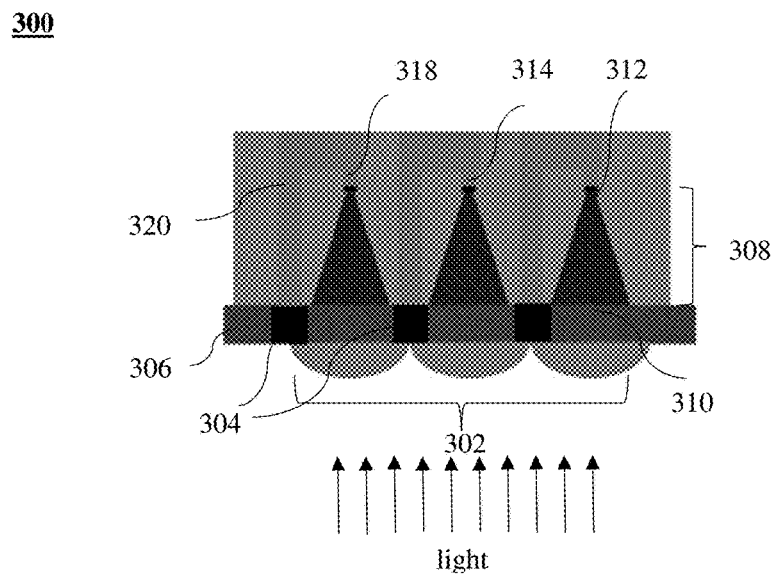
FIG. 3A shows schematically in cross section an embodiment of an integrated imaging system comprising an FPA integrated with a ROIC on a common Si wafer.

In an example, FPA 104 and ROIC 106 are integrated in the same Si wafer, FIG. 3A. In an example, the FPA and the ROIC are formed on separate Si wafers, which are then bonded, FIG. 3B. System 100 further includes an illumination lens (or a set of lenses) 108 positioned in an optical path 110 between illumination source 102 and the imaged entity, and collection optics in the form of a detector lens (or a set of lenses) 112 positioned in an optical path 114 between the imaged entity and the FPA. Proper packaging can be used to integrate the collection optics with the FPA. Optionally, system 100 may also include a filter 116 for rejecting all light besides the light emerging from the active illumination source and reflected from the imaged entity, the filter positioned in optical path 114. Active illumination source 102 is driven by a driver 118 and may be energized by an internal or external power source (not shown) through a power connector 120. The active illumination source can be synced to a FPA frequency mode in a well-known way. Signals read out by the ROIC can be transferred to an image processor 122 for processing into a SWIR image of the target. Various functions of the imaging system and its components may be controlled by a controller 124.

In an example, the active illumination source is a ~1350 nm LED, having desired monochromatic and illumination characteristics. The optical power of the illumination source can be orders of magnitude higher than that of a light source in the visible range. This, combined with the fact that the wavelength of choice is in the "solar blind" regime, offers a significant advantage in signal to noise ratio (SNR).

Figure 2:
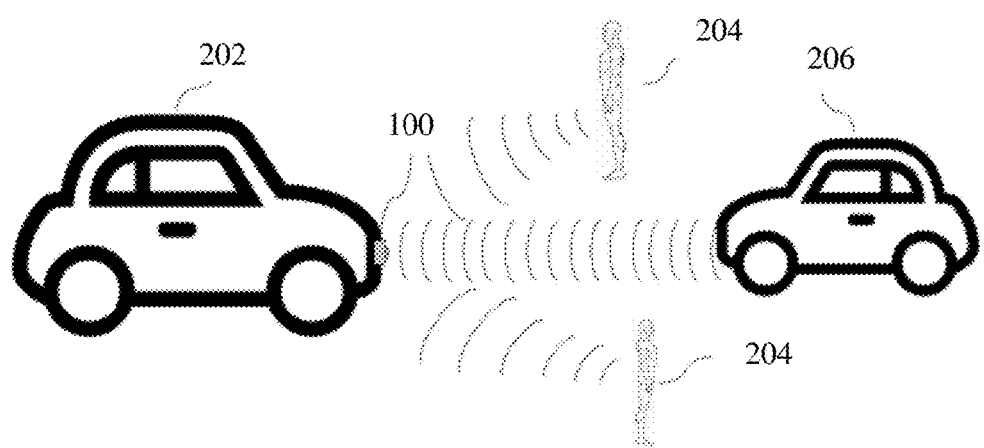
FIG. 2 illustrates the operation concept of an embodiment of an imaging system disclosed herein.

FIG. 2 illustrates schematically an exemplary operation concept of system 100 in a vehicular environment. The imaged entity may be for example a vehicle, a pedestrian, a physical barrier or other objects. System 100 is positioned on a vehicle 202 and its active illumination source illuminates various targets, here pedestrians 204 and a vehicle 206. The received/collected radiation is converted into an image of the imaged entity in well-known ways. Full coverage of a scene may be achieved by using a scanning device (not shown) or by integrating several active illumination sources.

Figure 3B:
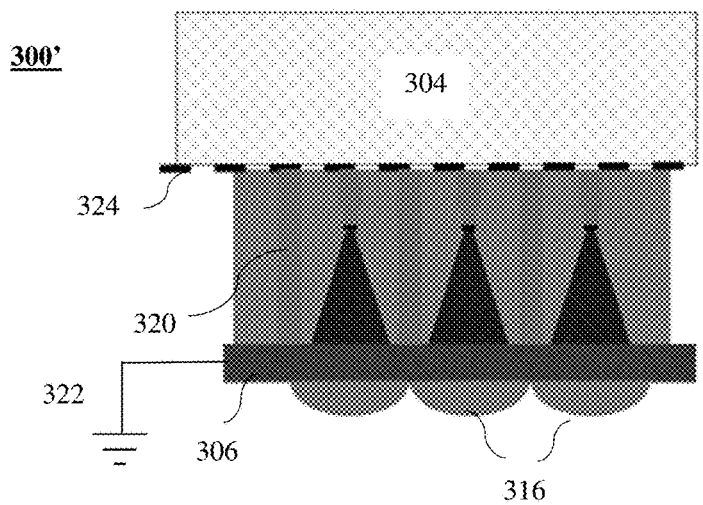
FIG. 3B shows schematically in cross section an embodiment of a hybrid imaging system comprising an FPA bonded to a ROIC through a bonding surface.

FIG. 3A shows schematically in cross section an embodiment of an integrated imaging system 300, comprising an FPA numbered 302 integrated with a ROIC 304 on a common Si wafer 306. FIG. 3B shows schematically in cross section an embodiment of a hybrid imaging system 300' comprising an FPA numbered 302 bonded to a ROIC 304 through a bonding surface 324. In contrast with all known FPAs operating in the SWIR wavelength range and which are normally based on non-silicon materials such as InGaAs, FPA 302 comprises (as mentioned above) only plasmonic enhanced pyramidal Si Schottky photodetectors 308. In an exemplary embodiment, each PD element of the FPA may have a configuration described in B. Desiatov, I. Goykhman, N. Mazurski, J. Shappir, J. B. Khurgin, and U. Levy, "Plasmonic enhanced silicon pyramids for internal photoemission Schottky detectors in the near-infrared regime," Optica, vol. 2, no. 4, pp. 335-338, (2015). In the embodiments of FIGS. 3A and 3B, FPA 302 integrates single plasmonic enhanced pyramidal Si Schottky PDs into an array, thereby enabling imaging (and not just detection). In an example, the FPA may be rectangular. In an example, the FPA may include hundreds to tens of thousands of plasmonic enhanced pyramidal PDs, each corresponding to a pixel of the FPA. In an example, the FPA may include hundreds to tens of thousands of plasmonic enhanced pyramidal PDs arranged in super-pixels.

Figure 3C:
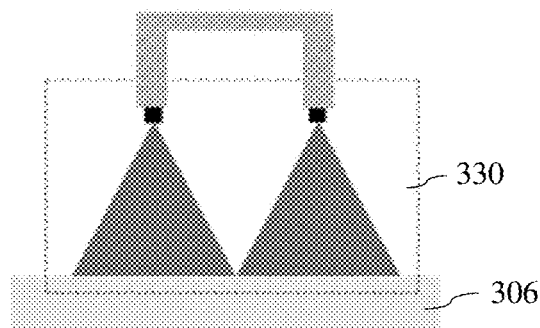
FIG. 3C shows a super-pixel of 2×2 pyramidal PDs.

By using a configuration of silicon and metals and by allowing the absorption of light to occur in the metal rather than in the silicon, the light at the SWIR wavelength regime can be detected via the process of internal photoemission. Responsivity can be improved as compared to a flat device by constructing an array of pyramidally shaped pixels. Due to the large cross-section of each pyramid, light is collected from a large area that corresponds to a pyramid base 310 through microlenses 316, is concentrated toward a nano apex 312 of the pyramid, is absorbed in the Schottky metal 314 and generates hot electrons. Using an internal photoemission process, the hot electrons cross over the Schottky barrier and are collected as a photocurrent. In an FPA embodiment, each pyramid defines a pixel. In other FPA embodiments, one can define a "super pixel" of several PD pyramids, e.g. in a 2×2 PD pyramid arrangement. An example, showing a cross section of a super pixel 330 implemented as a 2×2 pyramid structure is shown in FIG. 3C. All the PDs in a super-pixel share a single metal contact 318 (which is connected to all Schottky metals 314). Having more than one pyramid per pixel is advantageous in that it allows to achieve a thinner device while maintaining the lateral dimensions of the pixel fixed.

A variety of metals can be used for the Schottky PDs in order to optimize parameters such as responsivity, signal to noise ratio and manufacturability. The choice of metals can be (but not limited to) e.g. aluminum, copper, a metal silicide, gold, titanium, nickel and more. The availability of the Schottky metal simplifies the process of integration with an ROIC as one of the contacts (e.g. contact metal 318) is directly connected to Schottky metal 314 rather than to the silicon. The other (semiconductor side) contact 320 can be common to all pixels, e.g. by grounding the pyramid array to a ground 322 without the need for two separate contacts per pixel. This way, the challenge of achieving high quality ohmic contacts between the semiconductor and the metal is removed.

As an example, the FPA can include pixels of 5×5 μm with a metal layer covering the top 1×1 μm of the pyramid. The FPA is illuminated from its back, through microlenses 316. The top metal is that of the Schottky device, and it can be thick (~200 nm) or thin (down to few nanometers), depending on the available technology.

Figure 4A:
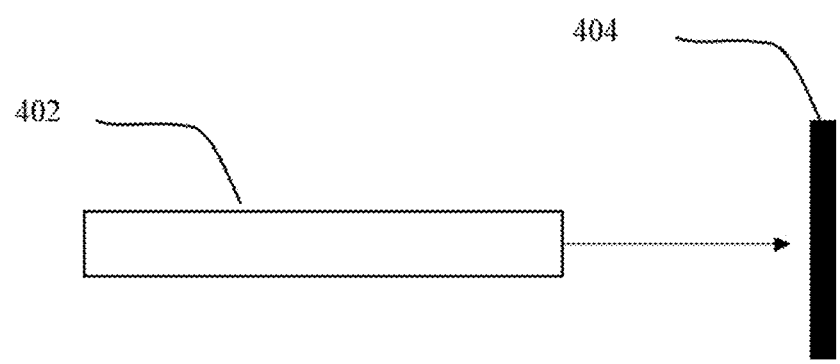
FIG. 4A shows light emerging from a light source and hitting a spiral phase plate that generates OAM.

FIG. 4A describes an approach of transmitting orbital angular momentum (OAM) beams with a specific order m. A phase plate 402 is placed in front of a light source 404 (which can be the same as active illumination source 102 in FIG. 1?) operating in the SWIR spectral band. The incident light is assumed to be circularly polarized. The phase plate modulates the phase of the incident beam according to $$\varphi = l\theta$$

where l is an integer and θ is the azimuthal coordinate. The total (normalized) OAM is given by m=l+σ, where σ is the normalized spin angular momentum. For incident light that is circularly polarized as $\sigma_+$ (right handed circularly polarized light) σ=1, whereas for incident light that is circularly polarized as $\sigma_-$ (left handed circularly polarized light) σ=−1.

Figure 4B:
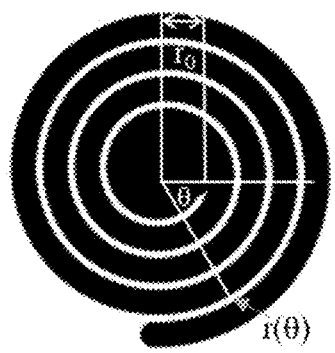
FIG. 4B shows a top view of the metallic section of a pixel shaped as a spiral.

FIG. 4B provides top view showing the receiving unit in each pixel. A spiral metal shape is generated (e.g. by lithography) on top of the apex of the silicon pyramid. The spiral can be designed by the following function, $$r(\theta) = r_0 + l\frac{\lambda}{2\pi}\theta$$

where r(θ) is the spiral radius and $r_0$ is the smallest radius at θ=0. Having this structure, light with the proper total OAM (e.g. l+1) will be focused into the central circle, and will be detected by the Schottky photodetector, whereas light with other values of OAM will not be focused and will not be detected. "Total OAM" refers to the summation of the OAM (the spiral phase) and the spin (the state of circularly polarized light).

Example of Method of Use

In an example of a method of use, light is projected by the active illumination source toward an imaged entity. The signal is scattered from the imaged entity and is collected by the photodetector. By doing so, the existence and the location of the imaged entity (e.g. a vehicle, a pedestrian, a physical barrier or other objects) is detected. The wavelength of illumination is around 1350 nm, which matches a region of high atmospheric absorption. As a result, direct sunlight at the specific wavelength band is barely present.

An example calculation of the system performance is described below. Light is emitted from an active illumination source, arrives at a target and is reflected back. Some of the reflected light arrives at a PD. The goal is to find how much light arrives at the detector after being transmitted from the source and reflected/scattered from the target object. This is done by radiometric calculations as follows:

The light intensity emitted by the active source is given by $$I = \frac{P_L}{\Omega} = \frac{P_E \eta_S}{\Omega}[W/sr],$$

where $P_L$ is the optical power of the light source, $P_E$ is the electrical power of the light source, $\eta_S$ the electrical to optical conversion efficiency of the light source, and Ω is the solid angle.

The optical flux arriving at the target is given by $$P_L / A \left[\frac{\text{Watt}}{\text{meter}^2}\right],$$

where A is the area of the light spot on the target.

The optical power reflected from the target is $$W_T = RP_L / A \left[\frac{\text{Watt}}{\text{meter}^2}\right],$$

where R is the ter reflection coefficient of the target. The target is assumed to be Lambertian, i.e. it scatters light at all directions.

The optical flux arriving at the PD is given by $$W_d = \frac{W_T}{4(F\#)^2}\left[\frac{\text{Watt}}{\text{meter}^2}\right]$$

where F # is the F-number of the detection optics, given by the ratio between the focal length and the diameter of the lens.

The light power arriving at each pixel is given by $$P_d = W_d A_p = \frac{RP_L}{4A(F\#)^2}A_p[\text{watt}] =,$$

where $A_p$ is the pixel active area.

A numerical evaluation of the optical power needed to detect a target at distance of about up to 50 meters, with a SNR of 1 is performed next. Assume a target reflectivity of 20%, conventional imaging optics with F #1, FPA pixel size of about 100 microns$^2$, a field of view (FOV) of 60×10 degrees. At that distance and with that FOV, the area A of light illuminating the target is about ~500 meter$^2$. With these parameters, one obtains $$\frac{P_d}{P_L} = 0.2 * \frac{10^{-10}}{4*500*1} = 1*10^{-14}$$

In the SWIR, due to the eye safety advantage, one can easily use a high power light source. To simplify, one can use light source with 250 W CW. Now, assigning $P_L$=250 W, we obtain $P_d$=2.5*10$^{-12}$ W. This power level defines the needed NEP (noise equivalent power) of a PD. Assuming a shot noise limited PD, the NEP is given by $$= \frac{\sqrt{2ei_d}}{R},$$

where $i_d$ is the dark current and R is the responsivity of the PD. The aim is a quantum efficiency of 30% around the wavelength of 1300 nm, and thus ~0.3 A/W. For a 1 Hz bandwidth, the allowed dark current is given by $$i_d = \frac{(NEP*R)^2}{2e} = \frac{(P_d*R)^2}{2e} \sim 1\mu A$$

which is well within the specifications of a Schottky based PD array.

Figure 5:
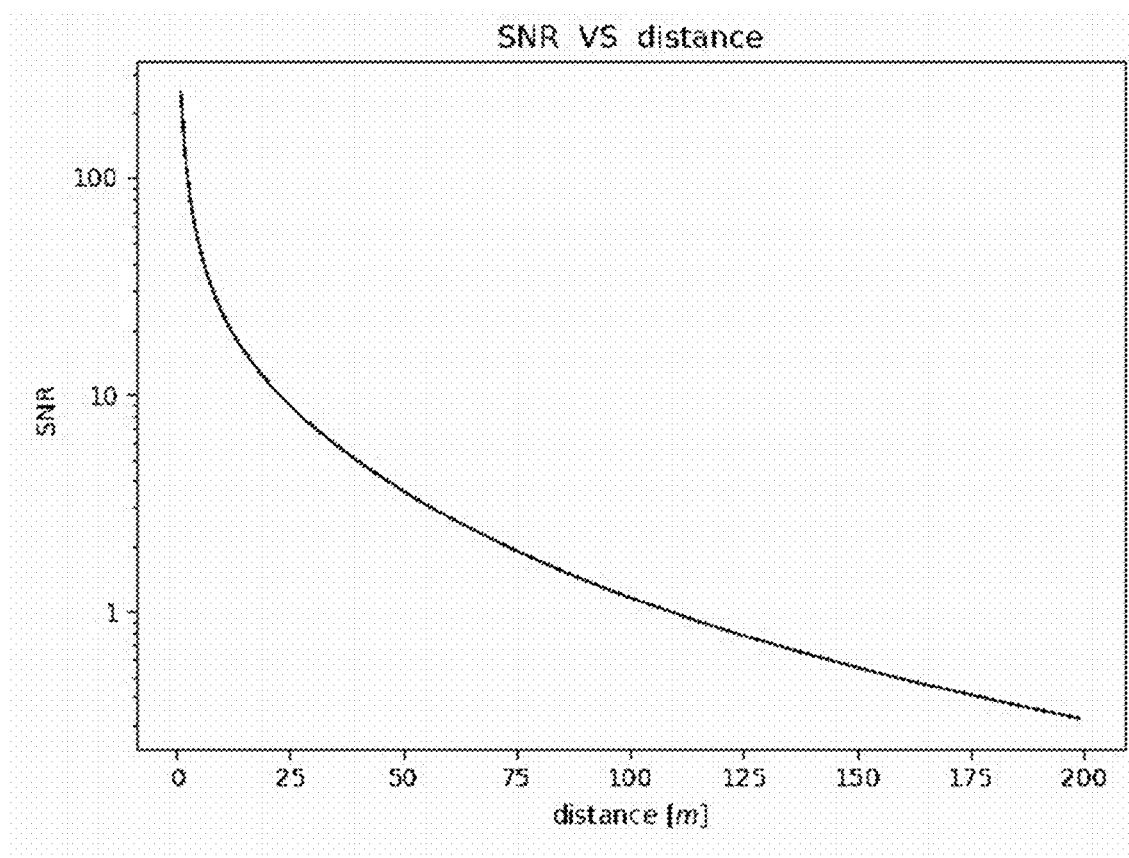
FIG. 5 shows a calculated SNR as a function of a distance from the active illumination source to the target to be detected.

Another way of looking at the problem is by calculating the SNR as a function of distance. FIG. 5 shows the SNR as function of distance from the active illumination source to a target to be detected. The simulation assumes the following parameters: pixel (PD) size 10×10 µm, quantum efficiency 10%, dark current density: $10^{-8}$ Amp/cm$^2$, number of pixels 1000×250, frame rate 30 Hz, F # of the imaging system=1.4, target reflectivity 20%, wavelength 1400 nm and average laser power of 0.3 W. The results show that even under very low power level, one can still detect an object (based on SNR=1 criterion) from a distance of 100 meters. Clearly, SNR and target range can both be improved by using active illumination source with higher power, as allowed in the SWIR due to more relaxed eye safety regulations as compared with the visible range.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. An imaging system, comprising:
    a) an active illumination source for illuminating a target in a short wave infrared (SWIR) wavelength range with radiation in the form of an orbital angular momentum (OAM) beam;
    b) a focal plane array (FPA) of plasmonic enhanced pyramidal silicon Schottky photodetectors (PDs), wherein each PD includes an embedded spiral plasmonic lens that can focus and detect a specific value of a total OAM, and wherein each PD is operative to detect SWIR radiation reflected from the target and to convert the detected SWIR radiation into an electrical signal; and
    c) a readout integrated circuit (ROIC) operatively coupled to the FPA and used to read out electrical signals the PDs, wherein the read out electrical signals are convertible into an image of the target.

2. The imaging system of claim 1, wherein the SWIR wavelength range includes the 1350 nm-1400 nm wavelength range.

3. The imaging system of claim 1, wherein the SWIR wavelength range includes the 1.450 nm-1600 nm wavelength range.

4. The imaging system of claim 1, wherein the FPA and the ROIC are formed integrally in a single silicon wafer.

5. The imaging system of claim 1, wherein the FPA and the ROIC are formed on separate silicon wafers.

6. The imaging system of claim 1, wherein the FPA includes a plurality of pixels and wherein each pixel includes a single plasmonic enhanced pyramidal silicon Schottky PD.

7. The imaging system of claim 6, wherein each plasmonic enhanced pyramidal silicon Schottky PD includes a contact to a silicon side of the Schottky PD and a contact to a metal side of the Schottky PD and wherein the contact to the metal side is common to all the Schottky PDs in a super-pixel.

8. The imaging system of claim 1, wherein the FPA includes a plurality of super-pixels, wherein each super-pixel includes a plurality of plasmonic enhanced pyramidal silicon Schottky PDs.

9. The imaging system of claim 1, wherein the imaging system is included in a vehicle.

10. A method comprising:
    a) actively illuminating a target with radiation in the form of an orbital angular momentum (OAM) beam in a short wave infrared (SWIR) wavelength range;
    b) using a focal plane array (FPA) of plasmonic enhanced pyramidal silicon Schottky photodetectors (PDs) to detect SWIR radiation reflected from the target, wherein each PD includes an embedded spiral plasmonic lens that can focus and detect a specific value of a total OAM; and
    c) converting the detected SWIR radiation into a SWIR image of the target.

11. The method of claim 10, wherein the using a FPA of plasmonic enhanced pyramidal silicon Schottky PDs includes using a FPA having single PD pixels to detect the SWIR radiation reflected from the target.

12. The method of claim 10, wherein the using a FPA of plasmonic enhanced pyramidal silicon Schottky PDs includes using a FPA having pluralities of PDs arranged in super-pixels to detect the SWIR radiation reflected from the target.

13. The method of claim 12, wherein each plasmonic enhanced pyramidal silicon Schottky PD includes a contact to a silicon side of the Schottky PD and a contact to a metal side of the Schottky PD and wherein the contact to the metal side is common to all the Schottky PDs in a super-pixel.

14. The method of claim 10, wherein steps (a) to (c) are performed in a moving vehicle.

15. A focal plane array (FPA), comprising: a plurality of plasmonic enhanced pyramidal silicon Schottky photodetectors (PDs), wherein each PD includes an embedded spiral plasmonic lens that can focus and detect a specific value of a total OAM, wherein each PD is operative to detect short wave infrared (SWIR) radiation reflected from a target in a short wave infrared (SWIR) wavelength range, and wherein the detected radiation is convertible into an image of the target.

16. The FPA of claim 15, wherein each plasmonic enhanced pyramidal silicon Schottky PD forms a pixel of the FPA.

17. The FPA of claim 15, wherein a plurality of plasmonic enhanced pyramidal silicon Schottky PDs form a super-pixel of the FPA.

18. The FPA of claim 15, wherein the SWIR wavelength range includes the 1350 nm-1400 nm wavelength range.

19. The FPA of claim 15, wherein the SWIR wavelength range includes the 1450 nm-1600 nm wavelength range.

20. The FPA of claim 15, wherein the FPA and the ROIC are formed integrally in a single silicon wafer.

\* \* \* \* \*